United States Patent
Liu et al.

(10) Patent No.: US 8,004,807 B2
(45) Date of Patent: Aug. 23, 2011

(54) OVERVOLTAGE PROTECTION CIRCUIT WITH REDUCED SENSITIVITY TO PROCESS VARIATIONS

(75) Inventors: Song Liu, Cupertino, CA (US); Ramesh Prakash, Campbell, CA (US); Guoxing Wang, Santa Clarita, CA (US)

(73) Assignee: Agere Systems Inc., Allentown, PA (US)

( * ) Notice: Subject to any disclaimer, the term of this patent is extended or adjusted under 35 U.S.C. 154(b) by 181 days.

(21) Appl. No.: 12/023,111

(22) Filed: Jan. 31, 2008

(65) Prior Publication Data
US 2009/0195943 A1    Aug. 6, 2009

(51) Int. Cl.
*H02H 3/20* (2006.01)
*H02H 9/04* (2006.01)
*H02H 9/00* (2006.01)

(52) U.S. Cl. .......................................... 361/91.1; 361/56

(58) Field of Classification Search ...................... 361/56
See application file for complete search history.

(56) References Cited

U.S. PATENT DOCUMENTS

| | | | | |
|---|---|---|---|---|
| 4,692,834 A | * | 9/1987 | Iwahashi et al. | 361/56 |
| 7,064,942 B2 | * | 6/2006 | Ker et al. | 361/56 |
| 7,616,416 B2 | * | 11/2009 | Chung et al. | 361/56 |
| 2008/0106834 A1 | * | 5/2008 | Hung | 361/56 |

* cited by examiner

*Primary Examiner* — Dharti H Patel
(74) *Attorney, Agent, or Firm* — Ryan, Mason & Lewis, LLP

(57) ABSTRACT

An overvoltage protection circuit includes a shunt circuit adapted for connection to at least one circuit node to be protected from an overvoltage condition and a voltage generator coupled to the shunt circuit. The shunt circuit is selectively activated as a function of a control signal supplied to the shunt circuit. The voltage generator is operative to generate the control signal for activating the shunt circuit during the overvoltage condition. The control signal has a level which varies in a manner that at least partially changes offsets in activation threshold of the shunt circuit.

22 Claims, 2 Drawing Sheets

US 8,004,807 B2

OVERVOLTAGE PROTECTION CIRCUIT WITH REDUCED SENSITIVITY TO PROCESS VARIATIONS

FIELD OF THE INVENTION

The present invention relates generally to electronic circuits, and more particularly relates to overvoltage protection circuitry.

BACKGROUND OF THE INVENTION

Overvoltage protection is employed in a variety of electronic devices and applications. For example, in integrated circuit (IC) designs, there are typically circuit nodes which require protection from high voltage so as to reduce the likelihood of damage to certain circuit elements in a circuit to be protected. Such high voltage may be defined as a voltage greater than that which the IC fabrication process will allow to ensure reliability of the IC. This could happen, for example, at boundaries across multiple voltage domains, for electrostatic discharge (ESD) protection, etc. Such overvoltage protection is conventionally performed by shunting a transistor to certain protected circuit nodes, where the shunting transistor provides a current discharge path and limits the voltage at the circuit node being protected. The shunting transistor should be turned on during the overvoltage event so as to conduct current and limit the voltage at the node to be protected when the voltage exceeds a prescribed threshold level, but must be turned off during normal operation to avoid excessive power consumption in the circuit and/or avoid limiting/saturating the useful signal swing.

One problem with conventional overvoltage protection circuitry is that the shunting transistor typically experiences large IC process variations so that the threshold voltage at which the transistor turns on, e.g., the lowest voltage that can turn on the transistor, may change over a wide range. This makes it difficult to protect sensitive circuit nodes, since if the threshold voltage is too high, the transistor will not turn on in time to protect the nodes efficiently. Alternatively, if the threshold voltage becomes too low, the circuit will cut off the signal voltage during normal operation by shunting to ground the circuit node to be protected.

Accordingly, there exists a need for an improved overvoltage protection circuit which does not suffer from one or more of the problems exhibited by conventional overvoltage protection circuits.

SUMMARY OF THE INVENTION

Illustrative embodiments of the present invention meet the above-noted need by providing an overvoltage protection circuit having a substantially constant trip voltage associated therewith. To accomplish this, a control signal applied to a shunt transistor device in one embodiment is adjusted as a function of a threshold voltage of the device so as to more closely compensate for variations in one or more IC fabrication process parameters to which the overvoltage protection circuit may be subjected.

In accordance with one aspect of the invention, an overvoltage protection circuit includes a shunt circuit adapted for connection to at least one circuit node to be protected from an overvoltage condition and a voltage generator coupled to the shunt circuit. The shunt circuit is selectively activated as a function of a control signal supplied to the shunt circuit. The voltage generator is operative to generate the control signal for activating the shunt circuit during the overvoltage condition. The control signal has a level which varies in a manner that at least partially changes offsets in activation threshold of the shunt circuit. Preferably, the control signal varies as a function of at least one process parameter, such as, for example, transistor threshold voltage.

These and other features, aspects and advantages of the present invention will become apparent from the following detailed description of illustrative embodiments thereof, which is to be read in connection with the accompanying drawings.

DETAILED DESCRIPTION OF THE INVENTION

The present invention will be described herein in the context of illustrative voltage protection circuits. It should be understood, however, that the present invention is not limited to these or any other particular circuit arrangements. Rather, the invention is more generally applicable to techniques for providing overvoltage protection to a circuit, without significantly reducing a speed and/or input voltage swing of the circuit. Although implementations of the present invention are described herein with specific reference to p-channel metal-oxide-semiconductor (PMOS) transistor devices, as may be formed using a complementary metal-oxide-semiconductor (CMOS) fabrication process, it is to be understood that the invention is not limited to such transistor devices and/or such a fabrication process, and that other suitable devices, such as, for example, n-channel metal-oxide-semiconductor (NMOS) transistors, bipolar junction transistors (BJTs), etc., and/or fabrication processes (e.g., bipolar, BiCMOS, etc.), may be similarly employed, as will be apparent to those skilled in the art. Although preferred embodiments of the invention are typically fabricated in a silicon wafer, embodiments of the invention can alternatively be fabricated in wafers comprising other materials, including but not limited to gallium arsenide (GaAs), indium phosphide (InP), etc.

Figure 1:
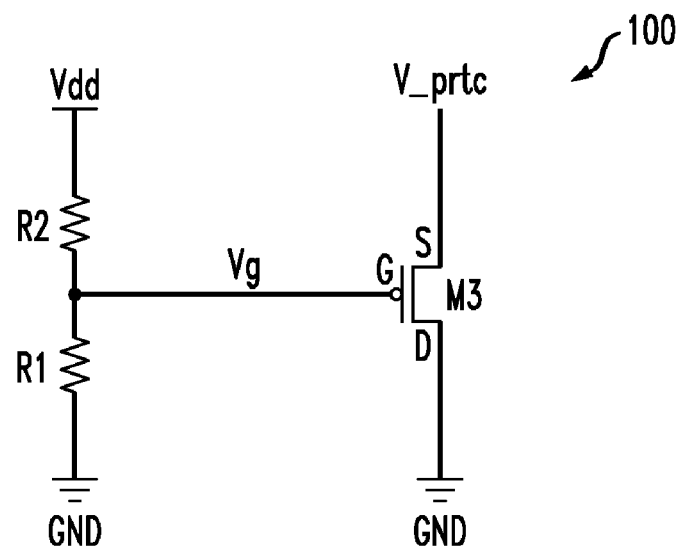
FIG. 1 is a schematic diagram illustrating an exemplary overvoltage protection circuit which can be modified to incorporate techniques of the present invention.

FIG. 1 is a schematic diagram illustrating an exemplary overvoltage protection circuit 100 which can be modified to incorporate techniques of the invention. Protection circuit 100 includes a PMOS shunting device, M3, having a source (S) adapted for connection to a circuit node, V_prtc, to be protected from an overvoltage event (e.g., a voltage above a prescribed voltage level), a drain (D) connecting to ground, or an alternative voltage return of the circuit (e.g., VSS), and a gate (G) for receiving a control signal, Vg, for selectively activating the shunting device M3. A simple voltage divider comprising a pair of resistors, R1 and R2, provides the control signal Vg. Resistors R1 and R2 may be replaced by an alternative resistive element, such as, for example, a pair of MOS transistor devices connected in a diode configuration, as will become apparent to those skilled in the art. One disadvantage of this overvoltage protection arrangement is that the control signal Vg for activating device M3 is independent of transistor threshold voltage. Consequently, control signal Vg will not track variations in the threshold voltage of the shunting device M3.

Figure 2:
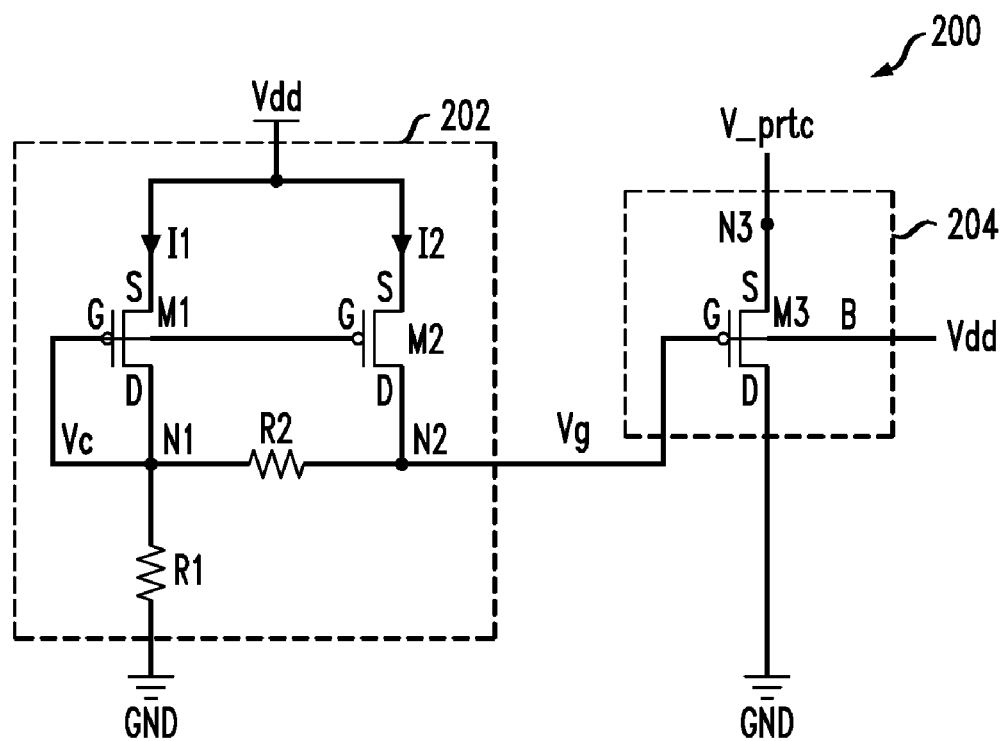
FIG. 2 is a schematic diagram depicting at least a portion of an exemplary overvoltage protection circuit, formed in accordance with an embodiment of the present invention.

FIG. 2 is a schematic diagram illustrating an overvoltage protection circuit 200, formed in accordance with an embodiment of the present invention. Overvoltage protection circuit 200 includes a voltage generator 202 and a shunt circuit 204 connected to an output of the voltage generator. Voltage generator 202 is operative to generate a control signal, Vg, for activating the shunt circuit 204 during an overvoltage event and for deactivating (i.e., turning off) the shunt circuit during normal operation, in absence of an overvoltage condition. Control signal Vg has a level which varies in a manner that at least partially changes offsets in activation threshold of the shunt circuit 204 (e.g., the voltage at which the shunt circuit is activated). The term "overvoltage condition" as used herein may be broadly defined to refer to any voltage greater than a prescribed level. The prescribed level may be, for example, a maximum allowable voltage for a given IC process technology without sustaining damage to the IC. The voltage generator 202 and shunt circuit 204 are adapted to be substantially insensitive to variations in at least one IC process parameter (e.g., transistor threshold voltage), as will be explained in further detail herein below.

Voltage generator 202 preferably includes a first PMOS transistor device, M1, and a second PMOS transistor device, M2. Sources of devices M1 and M2 are adapted for connection to a voltage supply of the circuit, which may be Vdd, and gates of devices M1 and M2 are connected to a drain of M1 at node N1. Node N1 is adapted for connection to a voltage supply return of the circuit, which may be ground (gnd), by way of a first resistor, R1, or alternative resistive element. Specifically, a first terminal of resistor R1 is connected to node N1 and a second terminal of R1 is connected to ground. A drain of device M2 is connected to node N1 via a second resistor, R2, or an alternative resistive element. More particularly, a first terminal of resistor R2 is connected to the drain of device M2 at node N2 and a second terminal of R2 is connected to node N1. A first current, I1, may be defined as the current flowing into the source of device M1. Likewise, a second current, I2, may be defined as the current flowing into the source of device M2. It is to be understood that the invention is not limited to the specific circuit configuration shown.

It is to be appreciated that, because a metal-oxide-semiconductor (MOS) device is symmetrical in nature, and thus bidirectional, the assignment of source and drain designations in the MOS device is essentially arbitrary. Therefore, the source and drain may be referred to herein generally as first and second source/drain, respectively, where "source/drain" in this context denotes a source or a drain.

Shunt circuit 204 preferably comprises a third PMOS transistor device, M3, or an alternative controllable switching arrangement. PMOS device M3 may be referred to herein as a protection transistor or a shunting device, particularly in view of its function of protecting a circuit node from an overvoltage condition by providing a shunt current path between the node being protected and a voltage supply return or alternative voltage source. A source of device M3 is connected to a circuit node, N3, to be protected from an overvoltage condition, a drain of M3 is adapted for connection to ground, or an alternative voltage supply return, and a gate of M3 is connected to the voltage generator 202 at node N2. When a voltage, V_prtc, at node N3 is at a high level relative to the voltage Vg at node N2, device M3 turns on to provide protection at node N3 against high voltage. More particularly, when the voltage V_prtc at node N3 is greater than about a threshold voltage above the gate voltage Vg supplied by the voltage generator 202, device M3 turns on and provides a current path to ground, thereby limiting the level of V_prtc.

The lowest voltage that can turn on device M3, which may be defined herein as the trip voltage, V_prtc_trip, is linearly dependent on the threshold voltage of M3. It is well known that the threshold voltage of a given MOS transistor varies significantly over variations in fabrication process parameters, among other factors. Assuming the gate voltage Vg of device M3 is substantially fixed, the trip voltage V_prtc_trip will also change significantly with process. For example, if the designed trip voltage V_prtc_trip is 1.0 volt under nominal process parameters, this voltage may be 1.2 volts under slow process conditions or 0.8 volt under fast process conditions. This relatively wide range of trip voltages would otherwise greatly limit the normal operation range and/or the protection capability of the protection circuit.

In order to beneficially provide a more narrow range of variation of the trip voltage associated with shunt device M3 while maintaining substantially the same protection at node N3, the voltage generator 202 is operative to track the threshold voltage of the shunt device M3 in the protection circuit 200 and to adjust the voltage Vg supplied to M3 as a function of the threshold voltage. In this manner, protection circuit 200 is substantially insensitive to IC process variations.

As apparent from the figure, device M1 in voltage generator 202 is preferably connected in a diode configuration and is in series with resistor R1. As such, a voltage, Vc, at node N1 will track the threshold voltage of M1. Devices M1 and M2 are connected in a current mirror configuration. Accordingly, the current I2 in device M2 will be proportional to the current I1 in device M1. Assuming devices M1, M2 and M3 are in close relative proximity to one another such that process parameters of these devices are substantially the same, the threshold voltages of M1, M2 and M3 will also track one another. Device M2 and resistor R2 are preferably operative to level-shift the voltage Vc at node N1 to voltage Vg at node N2. By adjusting certain parameters of device M2 and resistor R2, including, for example, resistor value, device size (e.g., channel width-to-length (W/L) ratio), etc., the trip voltage V_prtc_trip can be changed to accommodate different applications.

Assuming device M1 is operating in saturation, the following expression can be used to determine the voltage Vc at node N1:

$$Vc = Vdd - Vthp - \sqrt{\frac{2 \cdot I1}{\mu C_{ox} \frac{W1}{L1}}}, \qquad (1)$$

where Vdd is the supply voltage for protection circuit 200, Vthp is the absolute value of the threshold voltage of a given PMOS device, $\mu$ is surface mobility of a channel in the PMOS device, $C_{ox}$ is capacitance per unit area of gate oxide, W1 is effective channel width of device M1, and L1 is effective channel length of M1. The above equation may be simplified as:

$$Vc = Vdd - Vthp - \sqrt{\frac{2I1}{\beta}}, \qquad (2)$$

where $\beta$ is defined as a transconductance parameter which is approximately equal to $\mu C_{ox}(W/L)$. The voltage Vg at node N2 can be determined as follows:

$$Vg = I2 \cdot R2 + Vc = I2 \cdot R2 + Vdd - Vthp - \sqrt{\frac{2I1}{\beta}} \quad (3)$$

The following expression can be used to determine the trip voltage V_prtc_trip of PMOS shunt device M3:

$$V\_prtc\_trip = Vg + Vthp = I2 \cdot R2 + Vdd - \sqrt{\frac{2I1}{\beta}} \quad (4)$$

Since currents I1 and I2 are both dependent, to a large extent, on the threshold voltages (e.g., Vthp) of PMOS devices M1 and M2, respectively, it can be seen from equation 4 above that the influence of the threshold voltage can be largely cancelled through appropriate selection of values for R2 and β. Therefore, the impact of transistor threshold voltage variations on the trip voltage is significantly reduced and a substantially stable trip voltage V_prtc_trip is achieved under essentially all IC process conditions. Advantageously, the trip voltage V_prtc_trip can be tuned by changing certain circuit parameters, including, for example, currents I1 and I2, and resistors R1 and R2, thereby providing further flexibility. This methodology can be employed as a calibration feature after IC fabrication. In practice, optimal values for resistors R1, R2 and sizes of transistors M1, M2 and M3 may be determined by computer simulation so as to ensure a desired insensitivity of the trip voltage to threshold voltage variation. It is to be appreciated, however, that alternative methodologies for optimizing these circuit parameters are similarly contemplated.

More particularly, in case the threshold voltage (absolute value) of devices M1, M2 and M3 increases beyond its nominal value at certain process conditions, currents I1 and I2 will decrease and voltage Vc at node N1 will decrease accordingly. Voltage Vg will also decrease, as both Vc and the voltage drop across resistor R2 will decrease. The reduction of voltage Vg compensates for the increase in the threshold voltage of the shunting device M3 and stabilizes the trip voltage V_prtc_trip. Similarly, voltage Vg will increase when the threshold voltage of devices M1, M2 and M3 decreases, and the trip voltage V_prtc_trip again is stabilized against threshold voltage variations.

In accordance with other aspects of the invention, one or both of resistors R1 and R2 may be implemented by a programmable resistance element. By doing so, the trip voltage V_prtc_trip can be dynamically adjusted as a function of a control signal which changes in accordance with variations in process and/or temperature conditions to which the protection circuit 200 is subjected.

In most applications, the voltage at the protected node N3 will be lower than the supply voltage Vdd under normal operation of the protection circuit. Node N3 should be protected against receiving any voltages higher than Vdd so as to avoid damaging the IC. During normal operation, device M3 should be turned off and ideally conducts zero current. In practice, however, there is typically at least a small subthreshold leakage current (e.g., nanoamperes) which flows through the shunt device M3, even when turned off. Device M3 is therefore preferably sized so as to limit this leakage current to as low a value as possible so as not to affect normal operation of the circuit node being protected.

A bulk or body (B) of shunt device M3 is preferably adapted for connection to supply voltage Vdd, or an alternative voltage supply. Due to a body effect of device M3, when the voltage V_prtc at node N3 is higher than Vdd, the threshold voltage of M3 decreases making it easier for M3 to be turned on, thus providing more protection against the high voltage of V_prtc. During normal operation, when the voltage at node N3 is much smaller than Vdd, the threshold voltage of device M3 increases and thus M3 will conduct less current. This is desirable in that less conduction of M3 means less impact to signal paths corresponding to node N3 in the circuit being protected.

Figure 3:
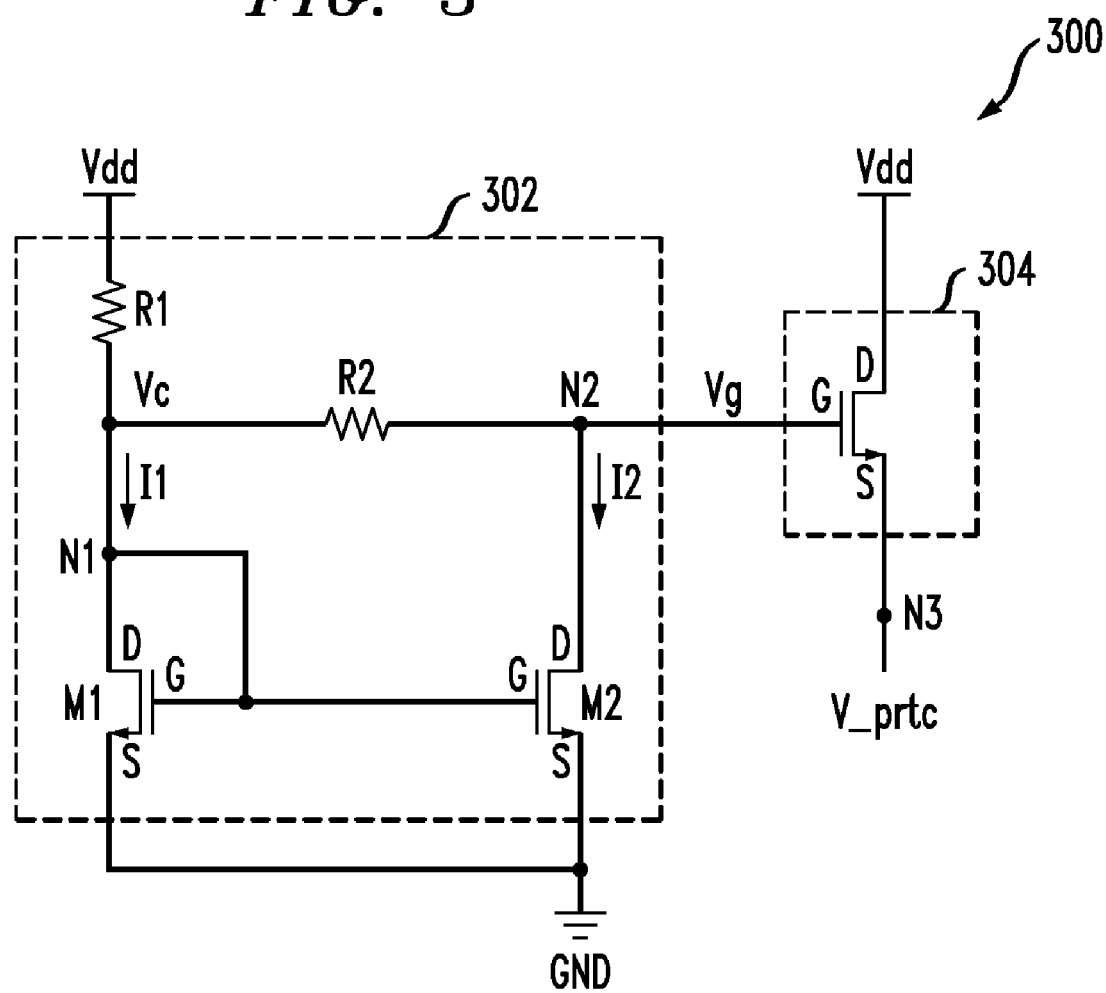
FIG. 3 is a schematic diagram depicting at least a portion of an exemplary overvoltage protection circuit, formed in accordance with another embodiment of the present invention.

Although PMOS devices are employed in protection circuit 200, it is to be understood that the teachings of the present invention may be similarly applied to form an overvoltage protection circuit utilizing NMOS devices. By way of example only, FIG. 3 illustrates at least a portion of an exemplary overvoltage protection circuit 300, formed in accordance with another embodiment of the invention. Overvoltage protection circuit 300 includes a voltage generator 302 and a shunt circuit 304 connected to an output of the voltage generator. Voltage generator 302 is operative to generate a control signal, Vg, for activating the shunt circuit 304 during an overvoltage event and for deactivating the shunt circuit during normal operation, when an overvoltage condition is not present.

Voltage generator 302 preferably includes a first NMOS transistor device, M1, and a second NMOS transistor device, M2. Sources of devices M1 and M2 are adapted for connection to ground (GND), or an alternative voltage return of the circuit (e.g., VSS), and gates of devices M1 and M2 are connected to a drain of M1 at node N1. Node N1 is adapted for connection to a voltage supply of the circuit, which may be Vdd, by way of a first resistor, R1, or alternative resistive element. Specifically, a first terminal of resistor R1 is connected to node N1 and a second terminal of R1 is connected to Vdd. A drain of device M2 is connected to node N1 via a second resistor, R2, or an alternative resistive element. More particularly, a first terminal of resistor R2 is connected to the drain of device M2 at node N2 and a second terminal of R2 is connected to node N1. A first current, I1, may be defined as the current flowing into the drain of device M1. Likewise, a second current, I2, may be defined as the current flowing into the drain of device M2. It is to be understood that the invention is not limited to the specific circuit configuration shown.

Shunt circuit 304 preferably comprises a third NMOS transistor device, M3, or an alternative controllable switching arrangement. Device M3 may be referred to herein as a protection transistor or a shunting device, particularly in view of its function of protecting a circuit node from an overvoltage condition by providing a conductive path between the node being protected and the voltage supply or alternative voltage source. A drain of device M3 is adapted for connection to the voltage supply Vdd, or an alternative voltage source, a source of M3 is connected to a circuit node, N3, to be protected from an overvoltage condition, and a gate of M3 is connected to the voltage generator 302 at node N2. When a voltage, V_prtc, at node N3 is at a low level relative to the voltage Vg at node N2, device M3 turns on to provide protection at node N3 against low voltage. More particularly, when the voltage V_prtc at node N3 is less than about a threshold voltage below the gate voltage Vg supplied by the voltage generator 302, device M3 turns on and provides a current path to Vdd, thereby limiting the level of V_prtc in a manner consistent to that described above in connection with the overvoltage protection circuit 200 shown in FIG. 2.

At least a portion of the overvoltage protection circuit of the present invention may be implemented in an integrated circuit. In forming integrated circuits, a plurality of identical die is typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. An overvoltage protection circuit, comprising:
a shunt circuit adapted for connection to at least one circuit node to be protected from an overvoltage condition, the shunt circuit being selectively activated as a function of a control signal supplied to the shunt circuit; and
a voltage generator coupled to the shunt circuit and operative to generate the control signal for activating the shunt circuit during the overvoltage condition, the control signal having a level which varies in a manner that at least partially compensates for variation in at least one process parameter of the shunt circuit.

2. The protection circuit of claim 1, wherein the control signal level varies as a function of the at least one process parameter.

3. The protection circuit of claim 1, wherein the at least one process parameter comprises transistor threshold voltage.

4. The protection circuit of claim 1, wherein the shunt circuit comprises a metal-oxide-semiconductor (MOS) transistor device including a first source/drain adapted for connection to the at least one circuit node to be protected, a second source/drain adapted for connection to a voltage supply return of the protection circuit, and a gate connected to the voltage generator and operative to receive the control signal.

5. The protection circuit of claim 4, wherein the MOS transistor device in the shunt circuit includes a bulk connected to a voltage supply source of the protection circuit.

6. The protection circuit of claim 1, wherein during the overvoltage condition, the shunt circuit is operative to form a conductive path for shunting current from the at least one circuit node to be protected to one of a voltage supply return and a voltage supply source of the protection circuit.

7. The protection circuit of claim 1, wherein in absence of the overvoltage condition, the shunt circuit is turned off.

8. The protection circuit of claim 1, wherein the level of the control signal is varied such that a trip voltage of the shunt circuit is substantially insensitive to the variation in the at least one process parameter.

9. The protection circuit of claim 1, wherein the circuit node to be protected is external to the overvoltage protection circuit.

10. An overvoltage protection circuit, comprising:
a shunt circuit adapted for connection to at least one circuit node to be protected from an overvoltage condition, the shunt circuit being selectively activated as a function of a control signal supplied to the shunt circuit; and
a voltage generator coupled to the shunt circuit and operative to generate the control signal for activating the shunt circuit during the overvoltage condition, the control signal having a level which varies in a manner that at least partially changes offsets in activation threshold of the shunt circuit;
wherein the voltage generator comprises:
first and second resistive elements; and
first and second p-channel metal-oxide-semiconductor (PMOS) transistor devices, the first PMOS transistor device having a first source/drain adapted for connection to a voltage supply source of the protection circuit, a second source/drain connected to a first terminal of the first resistive element, and a gate connected to the first terminal of the first resistive element, the second PMOS transistor device having a first source/drain adapted for connection to the voltage supply source, a second source/drain connected to a first terminal of the second resistive element, and a gate connected to the gate of the first PMOS transistor device, a second terminal of the first resistive element adapted for connection to a voltage supply return of the protection circuit, and a second terminal of the second resistive element connected to the first terminal of the first resistive element.

11. The protection circuit of claim 10, wherein the activation threshold of the shunt circuit is selectively adjusted by modifying at least one of a ratio of resistance values of the first and second resistive elements, a size of the first PMOS transistor device and a size of the second PMOS transistor device.

12. The protection circuit of claim 10, wherein the shunt circuit comprises a third PMOS transistor device including a first source/drain adapted for connection to the at least one circuit node to be protected, a second source/drain adapted for connection to the voltage supply return of the protection circuit, and a gate connected to the first terminal of the second resistive element.

13. An overvoltage protection circuit, comprising:
a shunt circuit adapted for connection to at least one circuit node to be protected from an overvoltage condition, the shunt circuit being selectively activated as a function of a control signal supplied to the shunt circuit; and
a voltage generator coupled to the shunt circuit and operative to generate the control signal for activating the shunt circuit during the overvoltage condition, the control signal having a level which varies in a manner that at least partially changes offsets in activation threshold of the shunt circuit;
wherein the voltage generator comprises:
first and second resistive elements; and
first and second n-channel metal-oxide-semiconductor (NMOS) transistor devices, the first NMOS transistor device having a first source/drain adapted for connection to a voltage supply return of the protection circuit, a second source/drain connected to a first terminal of the first resistive element, and a gate connected to the first terminal of the first resistive element, the second NMOS transistor device having a first source/drain adapted for connection to the voltage supply return, a second source/drain connected to a first terminal of the second resistive element, and a gate connected to the gate of the first NMOS transistor device, a second terminal of the first resistive element adapted for connection to a voltage supply source of the protection circuit, and a second terminal of the second resistive element connected to the first terminal of the first resistive element.

14. The protection circuit of claim 13, wherein the activation threshold of the shunt circuit is selectively adjusted by modifying at least one of a ratio of resistance values of the first and second resistive elements, a size of the first NMOS transistor device and a size of the second NMOS transistor device.

15. The protection circuit of claim 13, wherein the shunt circuit comprises a third NMOS transistor device including a first source/drain adapted for connection to the at least one circuit node to be protected, a second source/drain adapted for connection to the voltage supply source of the protection circuit, and a gate connected to the first terminal of the second resistive element.

16. An integrated circuit including at least one overvoltage protection circuit, the at least one overvoltage protection circuit comprising:
a shunt circuit adapted for connection to at least one circuit node to be protected from an overvoltage condition, shunt circuit being selectively activated as a function of a control signal supplied to the shunt circuit; and
a voltage generator coupled to the shunt circuit and operative to generate the control signal for activating the shunt circuit during the overvoltage condition, the control signal having a level which varies in a manner that at least partially compensates for variation in at least one process parameter of the shunt circuit.

17. The integrated circuit of claim 16, wherein the control signal level varies as a function of the at least one process parameter.

18. The integrated circuit of claim 16, wherein the at least one process parameter comprises transistor threshold voltage.

19. The integrated circuit of claim 16, wherein the shunt circuit comprises a metal-oxide-semiconductor (MOS) transistor device including a first source/drain adapted for connection to the at least one circuit node to be protected, a second source/drain adapted for connection to a voltage supply return of the at least one protection circuit, and a gate connected to the voltage generator and operative to receive the control signal.

20. An integrated circuit including at least one overvoltage protection circuit, the at least one overvoltage protection circuit comprising:
a shunt circuit adapted for connection to at least one circuit node to be protected from an overvoltage condition, the shunt circuit being selectively activated as a function of a control signal supplied to the shunt circuit; and
a voltage generator coupled to the shunt circuit and operative to generate the control signal for activating the shunt circuit during the overvoltage condition, the control signal having a level which varies in a manner that at least partially changes offsets in activation threshold of the shunt circuit;
wherein the voltage generator comprises:
first and second resistive elements; and
first and second p-channel metal-oxide-semiconductor (PMOS) transistor devices, the first PMOS transistor device having a first source/drain adapted for connection to a voltage supply source of the at least one protection circuit, a second source/drain connected to a first terminal of the first resistive element, and a gate connected to the first terminal of the first resistive element, the second PMOS transistor device having a first source/drain adapted for connection to the voltage supply source, a second source/drain connected to a first terminal of the second resistive element, and a gate connected to the gate of the first PMOS transistor device, a second terminal of the first resistive element adapted for connection to a voltage supply return of the at least one protection circuit, and a second terminal of the second resistive element connected to the first terminal of the first resistive element.

21. The integrated circuit of claim 20, wherein the activation threshold of the shunt circuit is selectively adjusted by modifying at least one of a ratio of resistance values of the first and second resistive elements, a size of the first PMOS transistor device and a size of the second PMOS transistor device.

22. An integrated circuit including at least one overvoltage protection circuit, the at least one overvoltage protection circuit comprising:
a shunt circuit adapted for connection to at least one circuit node to be protected from an overvoltage condition, the shunt circuit being selectively activated as a function of a control signal supplied to the shunt circuit; and
a voltage generator coupled to the shunt circuit and operative to generate the control signal for activating the shunt circuit during the overvoltage condition, the control signal having a level which varies in a manner that at least partially changes offsets in activation threshold of the shunt circuit;
wherein the voltage generator comprises:
first and second resistive elements; and
first and second n-channel metal-oxide-semiconductor (NMOS) transistor devices, the first NMOS transistor device having a first source/drain adapted for connection to a voltage supply return of the protection circuit, a second source/drain connected to a first terminal of the first resistive element, and a gate connected to the first terminal of the first resistive element, the second NMOS transistor device having a first source/drain adapted for connection to the voltage supply return, a second source/drain connected to a first terminal of the second resistive element, and a gate connected to the gate of the first NMOS transistor device, a second terminal of the first resistive element adapted for connection to a voltage supply source of the protection circuit, and a second terminal of the second resistive element connected to the first terminal of the first resistive element.

* * * * *